July 14, 1959  E. S. STODDARD  2,894,846
METHODS OF AND APPARATUS FOR PRESERVING FRESH FOODS
Filed March 30, 1955  3 Sheets-Sheet 1

INVENTOR.
Edgar S. Stoddard
BY Smith, Olsen, Baird
& Gulbrandsen,
Attys.

July 14, 1959     E. S. STODDARD     2,894,846
METHODS OF AND APPARATUS FOR PRESERVING FRESH FOODS
Filed March 30, 1955     3 Sheets-Sheet 2

INVENTOR.
Edgar S. Stoddard
BY Smith, Olsen, Baird
& Gulbrandsen
Attys.

July 14, 1959  E. S. STODDARD  2,894,846
METHODS OF AND APPARATUS FOR PRESERVING FRESH FOODS
Filed March 30, 1955  3 Sheets-Sheet 3

INVENTOR.
Edgar S. Stoddard
BY Smith, Olsen, Baird
& Gulbrandsen, Attys.

United States Patent Office 2,894,846
Patented July 14, 1959

2,894,846
METHODS OF AND APPARATUS FOR PRESERVING FRESH FOODS

Edgar S. Stoddard, Berwyn, Ill., assignor to General Electric Company, a corporation of New York Application March 30, 1955, Serial No. 497,970

26 Claims. (Cl. 99—217)

The present invention relates to methods of and apparatus for preserving fresh foods, particularly vegetables, fruits, berries, and the like.

Heretofore, it has been proposed that the satisfactory storage life of fresh foods of the class mentioned might be substantially extended by subjecting the fresh food to the simultaneous effects of refrigeration and irradiation with gamma rays. However, these suggestions have always proceeded upon the general basis that in order to retard the growth of bacteria responsible for decay, of saprophytic fungi responsible for mold, and of other agents responsible for other aspects of deterioration of such fresh food, it was necessary to subject the fresh food both to an intense beam of gamma rays and to a very substantial dosage rate thereof; whereby the sources involved were of such substantial activity that they were not only very expensive to manufacture, but of such character that health precautions permitted operation thereof only under very exacting conditions and only by highly technically qualified personnel.

Accordingly, it is a general object of the present invention to provide an improved method of and apparatus for preserving fresh foods of the general class including vegetables, fruits, berries, and the like, that involves, in conjunction with refrigeration the utilization of highly diffused gamma rays of exceedingly low intensities and at exceedingly low dosage rates; whereby the source involved is of such exceedingly low activity that the method may be practiced and the apparatus may be operated by anyone and without the exercise of any active health precautions on his part.

Another object of the invention is to provide a method of preserving fresh foods of the class noted, that may be carried out in a household refrigerator, that is entirely automatic as far as any attention on the part of the housewife is concerned, and that involves within itself no health hazard.

Another object of the invention is to provide apparatus for preserving fresh foods of the class noted, that may be readily incorporated into an existing household refrigerator, without any modification thereof, that requires no new operating procedure on the part of the housewife, and that involves within itself no health hazard.

A further object of the invention is to provide an improved method of and apparatus for preserving fresh foods that involves a humidity-controlled receptacle adapted for use in the storage of such foods in a household refrigerator, and incorporating simple structure for continuously subjecting the stored foods to the required exceedingly low dosage rates of gamma rays to accomplish a substantial extension of the satisfactory storage life of the fresh foods.

Further features of the invention pertain to the particular arrangement of the steps of the method and of the elements of the apparatus, whereby the above-outlined and additional operating features thereof are attained.

Before proceeding with the description of the steps of the method and the elements of the apparatus, it is first noted that the present invention is predicated upon the discovery that the satisfactory storage life of fresh foods of the general class including vegetables, fruits, berries, and the like, may be substantially extended by continuously subjecting the fresh food to the simultaneous effects of air circulation, refrigeration and irradiation with highly diffused gamma rays producing only an exceedingly low dosage rate therein. Specifically, it was discovered that such fresh foods are effectively preserved over greatly extended time intervals, when continuously subjected simultaneously to contact by a gentle current of cool air, to refrigeration at a temperature within the approximate range 35° F. to 50° F., and to irradiation by gamma rays at dosage rates within a band extending from about 10 milliroentgens per hour to about 20 milliroentgens per hour. Further, it was discovered that the conditions of the method could be readily established in the food storage compartment of a conventional household refrigerator provided with a humidity-controlled receptacle that, in turn, is provided with walls carrying on the interior surfaces thereof a coating incorporating therein radioactive material characterized by the emission of gamma rays and having a specific activity somewhat below 1 (about 0.5) microcurie per square inch of surface thereof.

Also, preliminary to the description of the invention, certain concepts and terminology involved in a discussion of radioactivity are set forth below:

(1) The radiodecay or disintegration of certain natural elements (RaC, etc.) and of certain artificially produced isotopes of other natural elements ($Zn^{65}$, $Co^{60}$, etc.) give rise to the emission of gamma rays or photons of electromagnetic energy.

Thus:

(a) $\quad \text{RaC} \longrightarrow \text{RaC}' + \text{beta} + \text{gamma}$ or $\quad _{83}\text{Bi}^{214} \longrightarrow {}_{84}\text{Po}^{214} + \text{beta} + \text{gamma}$ (b) $\quad _{30}\text{Zn}^{65}$ (by K-electron capture) $\longrightarrow {}_{29}\text{Cu}^{65} + \text{gamma}$ also $\quad _{30}\text{Zn}^{65} \longrightarrow {}_{29}\text{Cu}^{65} + \text{positron} + \text{gamma}$ also gamma (by internal conversion) $\longrightarrow$ electron + X-ray (c) $\quad _{27}\text{Co}^{60} \longrightarrow {}_{28}\text{Ni}^{60} + \text{beta} + \text{gamma}$ (2) The energy of the gamma ray produced in a given disintegration or transformation is peculiar to the transformation and may possess one or more discrete values. Thus the energies in m.e.v. (million electron volts) accompanying the following transformations have been measured:

(a) RaC→gamma (2.22 m.e.v.)
(b) $Zn^{65}$→gamma (1.11 m.e.v.)
(c) $Co^{60}$→gamma (1.17 m.e.v. and 1.33 m.e.v.)

(3) While the radiodecay or transformation of a given radioactive atom is a random effect that may take place at any time, or perhaps never from a practical view of time, the time interval required for ½ of a great number of such atoms to undergo its characteristic transformation is precise, and this factor is referred to as the "half-life" thereof. Thus, the following half-life measurements have been made:

(a) RaC→19.9 minutes
(b) $Zn^{65}$→250 days
(c) $Co^{60}$→5.3 years (4) The specific activity of a given radioactive element, with reference to the number of transformations occurring therein, per unit time, is obviously related to the half-life thereof and an activity corresponding to $3.7 \times 10^{10}$ transformations or disintegrations per second is referred to as a "curie". Thus the curie is a measure of the specific activity of any radioactive material (and not the intensity of the gamma rays emitted therefrom).

(5) In a source in the form of an artificially produced radioactive element only a fraction of the element present is of the radioactive isotope thereof, the remainder of the element present being of the normal isotope thereof that is not radioactive; whereby, it is necessary to refer to the activity of this type of source with reference to its volume or its weight. Thus a source of $Zn^{65}$ may be rated with respect to its activity as being in a given range, such, for example, as 75–130 millicuries per gram of the total zinc present in the source.

(6) The gamma rays proceeding from a highly concentrated source are projected into the associated space in a generally fixed direction and are thus in the form of a beam; whereas the gamma rays proceeding from a well distributed and highly dispersed source are projected into the associated space in random directions and are thus highly diffused.

(7) As gamma rays proceed from a source, they spread-out in accordance with the inverse square law; whereby, the intensity of the gamma rays at a given position displaced from the source is not only directly proportional to the specific activity of the source, but inversely proportional to the square of the distance between the source and the given position.

(8) As gamma rays proceed through a material (even air), they suffer a decrease in intensity due to total absorption. This total absorption is the result of two fundamental effects: (a) true absorption by an atom by having one of its electrons displaced from its normal level to some other level, or by having its electron completely removed therefrom; (b) scattering by the production of recoil electrons. The total absorption coefficients of different elements vary substantially, the elements of higher atomic number being more effective than the elements of low atomic number; and also in any given element there are remarkable absorption discontinuities with respect to the wave length of the gamma rays. However, in general, the total absorption characteristic of a given element is proportional both to the intensity of the impinging gamma rays and to the thickness of the sheet of the element; whereby with a given sheet of a given element in the path of given gamma rays the total absorption of the gamma rays is proportional to the thickness of the sheet.

(9) The dosage of gamma rays that is received by an object at a given position displaced from the source is a measure of the total quantity of gamma rays received by the object and is proportional both to the intensity of the gamma rays at the given position and to the total time interval of the exposure of the object to the gamma rays at the given position. The unit of measurement of dosage is the "roentgen"; and an object displaced 1 meter from 1 curie of radium will receive in 1 hour 8.4 roentgens of gamma rays, it being understood that an activity of 1 curie is that which will occur over 1 gram of radium after equilibrium has been established. This unit was established originally, as noted above, employing radium sealed in a glass envelope, but the system is generally applicable to all sources of gamma rays.

(10) The dosage rate received by an object at a given position displaced from the source is merely the time rate of the dosage thereon and is thus expressed in terms of roentgens per hour.

(11) Applying certain of the foregoing concepts and terminology to simple illustrations, it follows:

(a) An object displaced 1 meter from a radium source of gamma rays having an activity of 1 curie receives 8.4 roentgens per hour.

(b) An object displaced 1 meter from a radium source of gamma rays having an activity of 1 millicurie receives 8.4 milliroentgens per hour.

(c) An object displaced 1 centimeter from a radium source of gamma rays having an activity of 1 millicurie receives $8.4 \times 10$ roentgens per hour.

(12) When a space of substantial volume is permeated by gamma rays proceeding from a highly concentrated source, it is impossible to achieve dosage rates throughout the space that fall within a band of moderate width, because of the inverse square law. On the other hand, when such a space of substantial volume is permeated by gamma rays proceeding from a well distributed and highly dispersed source, it is possible to achieve dosage rates throughout the space that fall within a band of moderate width, because of the high degree of diffusion of the gamma rays, and nothwithstanding the inverse square law. These propositions are based upon considerations of geometry, explained more fully hereinafter.

The invention, both as to its organization and method of operation, together with further objects and advantages thereof, will best be understood by reference to the following specification taken in connection with the accompanying drawings, in which.

Figure 1:
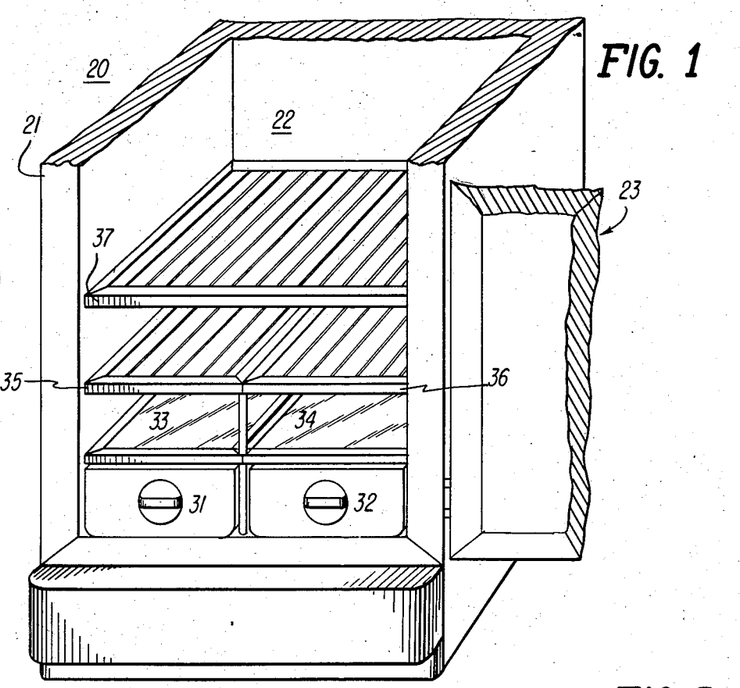
Figure 1 is a fragmentary front perspective view of the lower portion of a household refrigerator provided with a food storage compartment carrying in the bottom thereof two removable and substantially identical food storage receptacles, embodying the present invention, the front door of the refrigerator being illustrated in its fully open position.

Referring now to Fig. 1, there is illustrated the lower portion of a conventional household refrigerator 20 comprising a portion of the apparatus embodying the features of the present invention; which refrigerator 20 comprises a cabinet 21 defining a food storage compartment 22, as well as a refrigerating machine, not shown, that is adapted to refrigerate the food storage compartment 22 in the usual manner. The cabinet 21 is provided with a front door 23, illustrated in its fully open position; and within the bottom of the storage compartment 22 there are removably supported two food storage receptacles 31 and 32 respectively provided with glass covers 33 and 34 disposed thereabove and independently supported within the storage compartment 22. Arranged respectively above the glass covers 33 and 34 are a first pair of half-shelves 35 and 36 removably supported within the storage compartment 22; and arranged above the half-shelves 35 and 36 are a number of full shelves 37 removably supported within the storage compartment 22. In the arrangement, the two receptacles 31 and 32 are identical, each comprising a pan-like structure having connecting bottom, front, rear and opposed side walls defining an open top, these walls being imperforate, except for two vent holes (about 3/8") provided in the upper portion of each of the side walls respectively adjacent to the corners thereof. The glass covers 33 and 34 are identical, each being imperforate and spaced a short distance above the open top of the associated receptacle so as to define a top opening thereinto accommodating, together with the four vent holes previously mentioned, the limited circulation of a gentle current of cool air through the interior of the associated receptacle.

The half-shelves 35 and 36 are identical each being formed of open wirework construction; and the full shelves 37 are identical, each being of open wire-work construction. Accordingly, the shelves 35, 36 and 37 accommodate circulation of convection currents of air through the storage compartment 22. The refrigerating machine previously mentioned that is associated with the cabinet 21 includes an evaporator, not shown, that is operatively associated with the storage compartment 22; and the arrangement comprises thermal-controlled facility for maintaining a temperature within the storage compartment 22, falling in the general range 35° F. to 50° F., and preferably within the somewhat more limited range 37° F. to 46° F.

Figure 2:
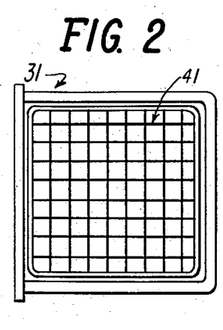
Fig. 2 is a plan view of one of the receptacles shown in Fig. 1, and also illustrating a removable rack that may be arranged therein.
Figure 3:
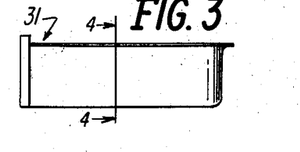
Fig. 3 is a side view of the receptacle shown in Fig. 2.
Figure 4:
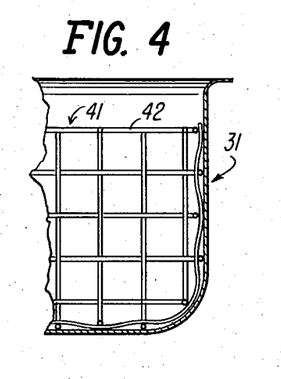
Fig. 4 is an enlarged fragmentary vertical sectional view of the receptacle and the rack, taken in the direction of the arrows along the line 4—4 in Fig. 3.

As illustrated in Figs. 2, 3 and 4, the receptacle 31 is substantially rectangular in plan and the pan thereof may have the dimensions: 11 5/8" x 11 3/8" x 5 5/8", the receptacle 31 having a depth between the front and rear walls thereof that is slightly greater than the width between the opposed side walls thereof. Also, as indicated in Fig. 4, the receptacle 31 may carry a removable rack 41 of basket-like construction and fabricated of wire-like elements 42 that may be formed entirely of a suitable synthetic organic plastic material or of a metal wire coated with such plastic material. The structure of the rack 41 is not critical and serves the basket purpose of receiving the fresh food to be stored in the receptacle 31.

Figure 5:
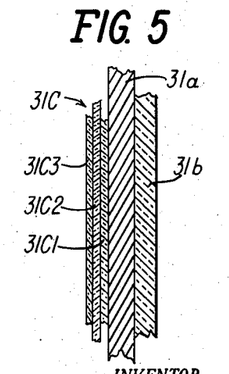
Fig. 5 is a greatly enlarged fragmentary development of the edge of the wall structure of the receptacle, as shown in Fig. 4, illustrating this wall structure comprises a metal wall and inner and outer porcelain enamel coatings carried thereby.

As best illustrated in Fig. 5, the wall structure of the receptacle 31 comprises a metal wall 31a that carries upon the exterior surface thereof an outer porcelain enamel coating 31b and that carries upon the interior surface thereof an inner porcelain enamel coating 31c. As indicated, the inner coating 31c is of composite structure including a ground coat or layer 31c1 intimately bonded directly to the interior surface of the metal wall 31a, an intermediate coat or layer 31c2 intimately bonded directly to the adjacent surface of the ground coat 31c1, and a finish coat or layer 31c3 intimately bonded directly to the adjacent surface of the intermediate coat 31c2; whereby the intermediate coat 31c2 is sandwiched between the ground coat 31c1 and the finish coat 31c3. The intermediate coat 31c2 has radioactive material incorporated therein in highly dispersed form; which material is characterized by the emission of gamma rays. Accordingly, the inner coating 31c carried by the wall 31a is commensurate with the interior surfaces of the bottom, front, rear and opposed side walls of the receptacle 31, whereby the source is well distributed so that the storage space defined in the receptacle 31 is permeated by highly diffused gamma rays. Of course, it will be understood that the finish coat 31c3 constitutes an absorption layer with respect to the gamma rays emitted by the intermediate coat 31c2; however, the absorption characteristic of the finish coat 31c3 is quite low.

While the radioactive material incorporated in the intermediate coat 31c2 of the inner coating 31c may comprise a number of artificially produced radioactive materials characterized by the emission of gamma rays, the material normally comprises $Zn^{65}$ or $Co^{60}$, and preferably $Co^{60}$.

In the manufacture of the receptacle 31, after the pan-like body thereof has been pressed or drawn from mild steel, the porcelain enamel coatings 31b and 31c are applied thereto. For example, after the pan-like body of the receptacle 31 has been formed, it is suitably cleaned in the usual manner; whereupon the ground coat 31c1 is applied to the interior surfaces of the walls thereof in any suitable manner; the ground coat 31c is then fired at about 1500° F. for a short time interval; the intermediate coat 31c2 is then applied to the ground coat 31c1, preferably by slushing or spraying; the intermediate coat 31c2 is fired at about 1500° F. for a short time interval; the finish coat 31c3 is then applied to the intermediate coat 31c2 in any suitable manner; and thereafter the receptacle 31 is transferred to a high-temperature furnace, wherein it is heated for a suitable time interval at a temperature of about 1500° F. so as to bring about fusion of the three coats 31c1, 31c2 and 31c3 and thorough bonding of the inner coat 31c to the adjacent interior surface of the wall 31a of the receptacle 31. The last firing of the receptacle 31 renders the composite coating 31c continuous, although of the 3-strata type (31c1, 31c2 and 31c3), as indicated in Fig. 5. Accordingly, the radioactive coat 31c2 occupies a position sandwiched between the coats 31c1 and 31c3, as previously noted, whereby it is protected against direct contact with the fresh food that is stored in the receptacle 31; and in passing, it is noted that the finish coat 31c3 should be of the acid-resistant type. Specifically, the coats 31c1 and 31c3 may be of conventional composition comprising a frit of the titanium oxide type.

In the above description no reference was made to the manner of applying the outer coating 31b, since this is in no way critical and may be effected in any suitable manner.

Turning now to the handling of the radioactive coat 31c2, special precautions must be taken because of the health hazards involved in manufacture. For example, a water suspension of a conventional acid-resistant and titanium oxide enamel glass may be prepared by grinding a typical batch in a closed porcelain lined ball mill to a fineness of 3 grams residue from a 100 gram sample on a mesh screen. A typical batch may have the following approximate composition:

| | |
|---|---:|
| Titanium oxide glass (frit) ____________lbs__ | 100 |
| Clay _______________________________lbs__ | 4 |
| Potassium chloride __________________oz__ | 4 |
| Bentonite __________________________oz__ | 1 |
| Water _____________________________lbs__ | 40 |

To this batch, a small quantity of the radioactive isotope ($Co^{60}$) is added; the mill is closed; and the batch is ball-milled for an additional 30 minutes to insure a substantially uniform distribution of the material and a high degree of dispersion of the small amount of radioactive isotope incorporated therein.

The manner of calculating the small quantity of the radioactive isotope that is required in the above-described batch is discussed more fully below; and here, it is noted that the radioactive coat 31c2 is applied to the ground coat 31c1 at a weight of about 20 gms. to 25 gms. of dry enamel per square foot of surface, and that the resulting area has an activity of approximately 0.5 microcurie per square inch.

Considering now in greater detail the calculations mentioned above, it is noted that the $Co^{60}$ is normally obtained from the U.S. Atom Energy Commission through the Oak Ridge National Laboratories, at Oak Ridge, Tennessee, in the form of $CoCl_2$ dissolved in 0.9 N hydrochloric acid, is of about 99% purity, and at a concentration of activity somewhat in excess of 1 millicurie per milliliter of the solution, the specific activity of the isotope being in the approximate range 0.5–5 curies per gram of cobalt present. This isotope has a half-life of 5.3 years and is characterized by emission mechanisms productive of beta particles having an energy of 0.31 m.e.v. and gamma rays of energies of both 1.17 m.e.v. and 1.33 m.e.v.

Upon receiving the radioactive material, the activity thereof is measured, as it is obvious that the activity thereof is dependent upon many factors including the age thereof, and it may be assumed that the measurement indicates that the activity is 1 millicurie per milliliter of solution. The solution is then diluted by the addition of distilled water so as to obtain a specific activity of 0.1 millicurie per milliliter, and is then titrated by the addition of 0.01 N NaOH until near neutrality (pH slightly below 7.0). The resulting solution may have a specific activity of 5.7 microcuries per milliliter, and is then added to the batch described above in the required quantity in order to obtain the specific activity of about 0.5 microcurie per square inch in the final coating $31c$ carried by the interior surface of the receptacle 31. Thus, the activity of the coating $31c$ is about 72 microcuries per square foot; and the radioactive coat $31c2$ may have a weight of 20 grams per square foot. Accordingly, the activity of each gram of the dry ingredients of the batch previously described should be about 3.6 microcuries; whereby about 0.6 milliliter of the prepared solution having an activity of about 5.7 micrcuries per milliliter should be added to the batch for each gram of dry ingredients thereof.

While the laboratory technique that is employed in the preparation of the radioactive enamel of the intermediate coat $31c2$ of the inner coating $31c$ of the receptacle 31 has been described with great particularity, this has been done only for the purpose of providing instructions for the safe handling of this material, because of the health hazards involved, and not because these particular details are in any way critical, as it will be apparent to the skilled chemist that the matter of the incorporation of the required amount of the radioactive isotope into the enamel of the intermediate coat $31c2$ may be achieved in accordance with a great variety of standard laboratory precedures.

In view of the foregoing, it will be understood that the specific activity of the inner coating $31c$ of the receptacle 31 is approximately 0.5 microcurie per square inch of surface thereof; whereby the dosage rates within the useful volume of the receptacle 31 disposed within the rack 41 are within a band disposed entirely below 100 milliroentgens per hour, as a consequence of the geometry of the receptacle 31. Specifically, the band mentioned extends from about 10 milliroentgens per hour to about 20 milliroentgens per hour. This fairly uniform dosage rate throughout the useful volume of the receptacle 31 results from the geometry thereof, the high degree of distribution of the source of gama rays with respect to the useful volume thereof, and the high degree of dispersion of the radioactive isotope in the coating $31c$; whereby the gama rays permeating the useful volume of the receptacle 31 are highly diffused. Considering now in greater detail the importance of the high degree of diffusion of the gamma rays permeating the useful space in the receptacle 31, it will be appreciated that at any given position within the useful volume of the receptacle 31 the composite flux of gamma rays results from an integration of the five emissions from the five facing boundary walls of large area, neglecting total absorption effects; which five boundary walls or components of the source are not only disposed in the W, Y, and Z planes, but each of these components is well distributed and highly dispersed. When the integration mentioned is made for all of the positions within the useful volume of the receptacle 31, it will be discovered that there is a considerable uniformity of dosage rates throughout this volume and all within the moderate band extending from about 10 milliroentgens per hour to about 20 milliroentgens per hour. At this point, it is reiterated that it is this high degree of diffusion of the gamma rays permeating the useful space within the receptacle 31 that prevents a great spread of the band of the dosage rates resulting from the operation of the inverse square law.

Figure 6:
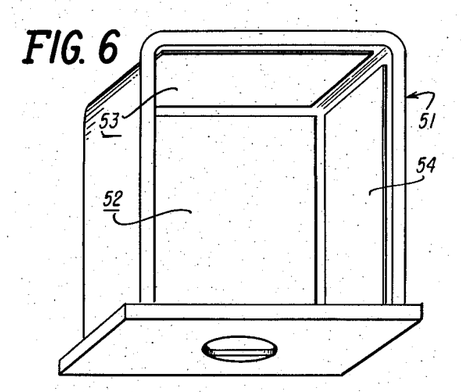
Fig. 6 is a top perspective view of a modified form of the receptacle for use in the storage compartment of the refrigerator, as shown in Fig. 1, this form of the receptacle being especially designed for test purposes.
Figures 7, 8:
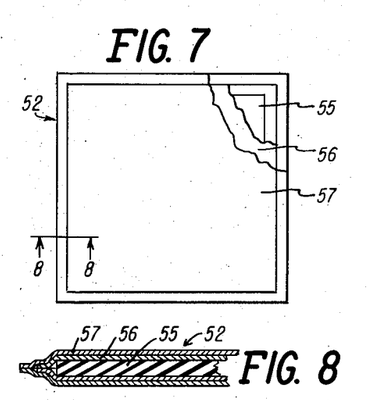
Fig. 7 is a plan view, partly broken away, of the one of the radioactive units carried by the bottom wall of the receptacle shown in Fig. 6.
Fig. 8 is a greatly enlarged fragmentary sectional view of the radioactive unit, taken in the direction of the arrows along the line 8—8 in Fig. 7.
Figure 9:
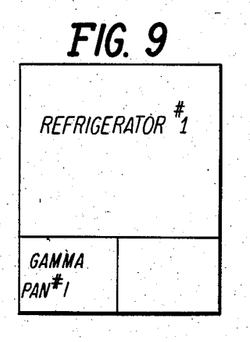
Figs. 9 to 13, inclusive, are diagrammatic illustrations of five corresponding arrangements of test receptacles that were employed in five corresponding refrigerators involved in a test of the method and the apparatus.
Figure 10:
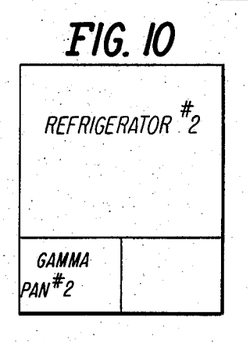
Figure 11:
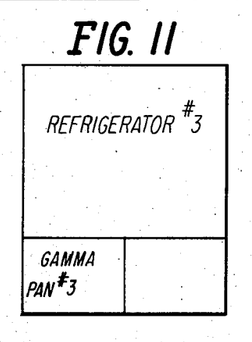
Figure 12:
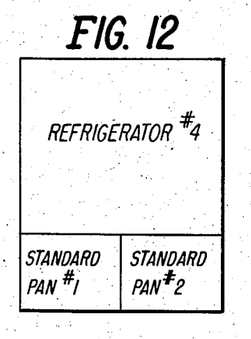
Figure 13:
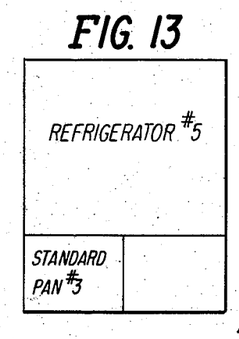
Figure 14:
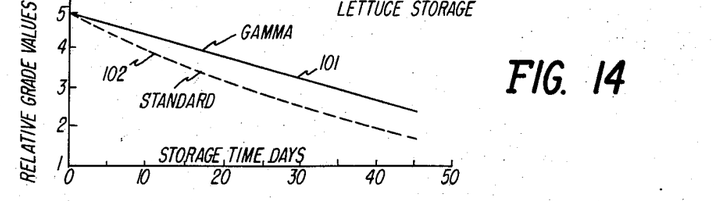
Figs. 14 to 18, inclusive, are five sets of curves comparing the results of the test mentioned as applied to five corresponding species of fresh food.
Figure 15:
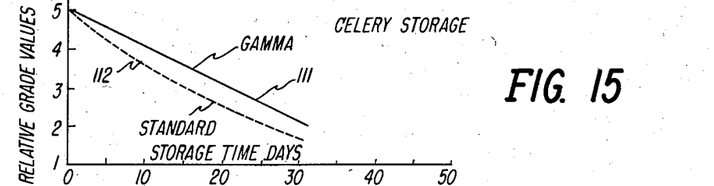
Figure 16:
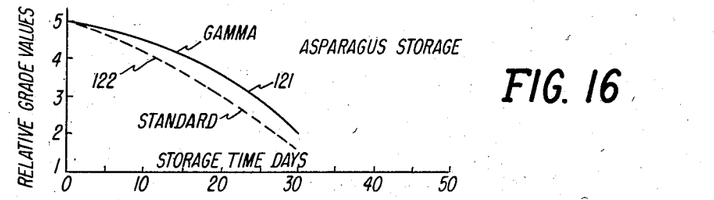
Figure 17:
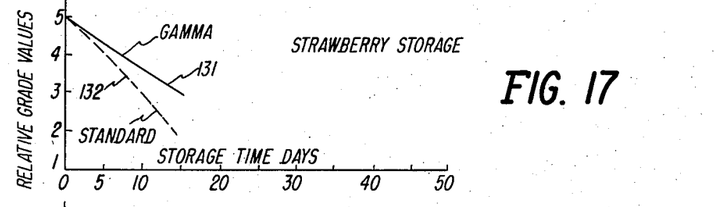
Figure 18:
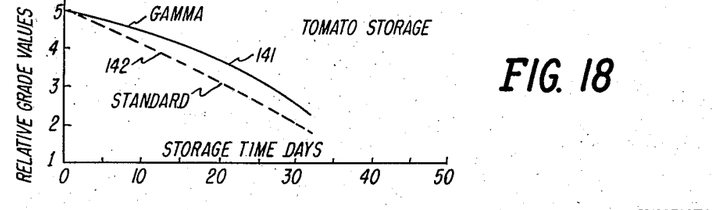

Referring now to Figs. 6 to 8, inclusive, a modified form of the food storage receptacle 51 is there illustrated that was especially designed for test purposes, which test receptacle 51 is entirely of conventional construction with reference to dimensions and the component elements thereof, and modified by the incorporation thereinto of five radioactive pads suitably secured to the interior surfaces of the respective bottom, front, rear and opposed side walls thereof. As illustrated in Fig. 6, the radioactive pads respectively secured to the interior surfaces of the bottom wall, rear wall and right-hand side wall are indicated respectively at 52, 53 and 54. As best shown in Figs. 7 and 8, the radioactive pad 52 comprises a core 55, an inner envelope 56 in which the core 55 is sealed, and an outer envelope 57 in which the inner envelope 56 is sealed. The inner envelope 56 is formed of pure copper foil of 0.002" thickness, the edges thereof being soldered so as to provide a gas-tight enclosure for the core 55. The outer envelope 57 is formed of aluminum sheet of 0.020" thickness, the edges thereof being spot-welded so as to provide a secure enclosure for the inner envelope 56. Finally, the border edges of the resulting sandwich-like construction are coated with a suitable alkyd resin so as to prevent access of food acids thereinto. The core 55 may be formed of blotter paper of 0.020" thickness and has radioactive material incorporated therein, as described more fully hereinafter. Of course, it will be understood that in the radioactive pad 52 the interior walls of the inner envelope 56 and the outer envelope 57 constitute absorption layers with respect to the gamma rays emitted from the core 55; however, the total absorption charcteristics of these two walls mentioned are relatively low since they are relatively thin.

Turning now to the releated dimensions in the test receptacle 51, the bottom wall thereof may have the inside dimensions of 11⅝" x 11¾", each of the front and rear walls thereof may have the inside dimensions of 11⅜" x 5⅝" and each of the side walls thereof may have the inside dimensions of 11⅝" x 5⅝". In the radioactive pad 52, the dimensions of the core are 9" x 9", the dimensions of the inner envelope are 10" x 9½", and the dimensions of the outer envelope are 10⅝" x 10¼". In the radioactive pad 54, the dimensions of the core are 5½" x 3½", the dimensions of the inner envelope are 6½" x 4", and the dimensions of the outer envelope are 7¼" x 4¾". In the radiocative pad 53, the dimensions of the core are 8½" x 3½", the dimensions of the inner envelope are 9½" x 4", and the dimensions of the outer envelope are 10¼" x 4½".

In each of the radioactive pads 52, etc., the core has incorporated therein $Zn^{65}$ obtained from the source previously mentioned; this $Zn^{65}$ has a half-life of 250 days, and characterized by emission mechanisms productive of positrons, fast electrons, X-rays and gamma rays of an energy of 1.1 MEV. In the material as received, the $Zn^{65}$ is in the form of $ZnCl_2$ dissolved in 0.9 N hydrochloric acid, is of about 98% purity, and at a concentration of activity of about 11.25 millicurie per milliliter of solution, the specific activity of the isotope being in the approximate range 75–130 millicuries per gram of zinc present. In preparing the core, the solution noted above was first diluted by the addition of distilled water to an activity of 0.1 millicurie per milliliter; next, the solution was titrated with 0.01 N NaOH until a pH value slightly below 7.0 was reached. This ultimate solution was uniformly deposited on the blotter paper of the core at a surface density of about 0.07 millicurie per square inch. The radioactive pad was then sealed in the inner and outer envelopes, in the manner previously described.

The five radioactive pads described were secured to the corresponding interior surfaces of the test receptacle 51 by an adhesive tape, and the entire interior surface of the test receptacle 51 was covered by a liner of thin synthetic organic plastic sheet formed of copolymers of vinylidene chloride and vinyl chloride of the character sold as "Saran Wrap." The liner mentioned was also secured in place by adhesive tape; and within the liner there was arranged a rack, not shown, of open basket-like construction of the general character of the rack 41 previously described in conjunction with the receptacle 31. In the test receptacle 51 the average dosage rates throughout the useful space within the rack mentioned fell within a band disposed entirely below 100 milliroentgens per hour, the width of the band extending from about 10 milliroentgens per hour to about 20 milliroentgens per hour. This modest width of the band mentioned results from the geometry of the test receptacle 51 and from the circumstance that the composite source is well distributed and highly dispersed; whereby the gamma rays permeating the useful volume within the test receptacle 51 are highly diffused. The geometrical considerations that bring about this result in the test receptacle 51 are substantially the same as those described in detail above in conjunction with the receptacle 31.

In order to test the effectiveness of the present method and apparatus in preserving fresh foods selected from the class including vegetables, fruits, berries and the like, a number of test receptacles of the character of the test receptacle 51 described in conjunction with Figs. 6 to 8, inclusive, were first produced from conventional humidity-controlled receptacles and a number of identical refrigerators of the conventional household type were procured. In this test, three of the test receptacles of the construction of the test receptacle 51 were designated as "gamma pan #1," "gamma pan #2" and "gamma pan #3"; three of the unmodified receptacles were designated as "standard pan #1," "standard pan #2" and "standard pan #3"; and the five refrigerators were designated as "refrigerator #1," "refrigerator #2," "refrigerator #3," "refrigerator #4" and "refrigerator #5."

In the test, the gamma pans and the standard pans were filled with respective samples of fresh food, in a manner explained more fully hereinafter, and were placed in the five refrigerators in the five particular arrangements respectively shown in Figs. 9 to 13, inclusive, so as to obtain entirely comparable results. Each of the five refrigerators was operated to maintain the temperature within the food storage compartment thereof within the narrow range 37° F. to 46° F.; and the test involving the five refrigerators was simultaneous.

Turning now to the matter of the selection of the fresh foods to be tested, it was decided that the entire class was adequately represented by the members: lettuce, celery, asparagus, strawberries and tomatoes; whereby the test was confined to these members. In the test, it was necessary to establish a quality-grading system of the fresh foods indicative of the state of preservation thereof as time proceeded and involving factors concerning appearance, amount of drying, extent of deterioration, and, in some cases, odor and flavor; whereby a grading system was evolved that proceeded from grade #5 to grade #1, with the following significance:

Grade #5—perfect—original condition
Grade #4—good—all portions usable, but with some portion slightly below original condition
Grade #3—fair—some portion unusable
Grade #2—poor—some portion usable
Grade #1—bad—no portion usable Thus, it is apparent that there is only a small range difference between grade #5 and grade #4, but that there is a considerable range difference between grade #4 and grade #3. Moreover, from a practical standpoint, it is apparent that the real object of the test was to determine the extension of the storage time interval of the fresh food that could be procured between grade #5 and grade #4, and that the matter of the time intervals involved between grade #4 and grade #3, etc., are only of scientific interest in that they verify the conclusion with reference to the extension of the satisfactory storage time interval between grade #5 and grade #4.

In the test, each of the gamma pans #1 to #3, inclusive, and each of the standard pans #1 to #3, inclusive, was provided with a load of fresh food comprising:

(a) Lettuce—one head
(b) Celery—three stalks
(c) Asparagus—one bunch of about ten individual stalks
(d) Strawberries—about ½ pint in a perforated paper cup
(e) Tomatoes—3—of average size, about 2½" in diameter The six pans mentioned, after being loaded, were placed in the five refrigerators in accordance with the five patterns, as indicated in Figs. 9 to 13, inclusive, after the five respective refrigerators were at a temperature (within the range 36° F. to 46° F.) and the test proceeded 42 days. During the test period, each of the storage pans was opened three times each working day and the foods contained therein were inspected, and at selected intervals the foods were graded in the manner previously explained. For example, the lettuce was graded at the expiration of the intervals (in days): 10, 21 and 25. The grading intervals (in days) of some of the other foods were: asparagus—14, 21 and 28; tomatoes—10, 15 and 21; strawberries—6, 10 and 15. Specifically, the grading of the foods was progressive with respect to the different pans mentioned. For example: all of the #1 pans were graded and the contents discarded at the end of the first time interval; all of #2 pans were graded and the contents discarded at the end of the second time interval; etc. Throughout the test, the temperature within the storage compartment of each refrigerator was maintained by the operating cycle of the associated refrigerating machine within the range 40–44° F.; however, each time the front door of any refrigerator was opened, the temperature within the food storage compartment thereof rose to about 57° F., although the temperature within the food storage compartment therein was restored back into its normal range 40–44° F., within 15 minutes after reclosure of the front door thereof. Throughout the test, the temperatures within the gamma pan #1, etc., and within the standard pan #1, etc., were maintained substantially constant at 42° F., the temperature within any pan rising only 1° F., upon removal and opening thereof, and again falling back to the temperature of 42° F., within 45 minutes after reclosure and replacement thereof. In the test, the five refrigerators were empty, except for the gamma pan #1, etc., and the standard pan #1, etc., as indicated in Figs. 9 to 13, inclusive.

At the conclusion of the test, the relative grade values of the different foods were averaged and plotted against storage time in days, as indicated in the respective graphs of Figs. 14 to 18, inclusive. Specifically: in Fig. 14, the curves 101 and 102 indicate the average grade values of lettuce-storage respectively in the three gamma pans and in the three standard pans; in Fig. 15, the curves 111 and 112 indicate the average grade values of celery-storage respectively in the three gamma pans and in the three standard pans; in Fig. 16, the curves 121 and 122 indicate the average grade values of asparagus-storage respectively in the three gamma pans and in the three standard pans; in Fig. 17, the curves 131 and 132 indicate the average grade values of strawberry-storage respectively in the three gamma pans and in the three standard pans; and in Fig. 18, the curves 141 and 142 indicate the average grade values of tomato-storage respectively in the three gamma pans and in the three standard pans.

In these tests, the really significant factor is the extension of the satisfactory storage time interval that is required for the fresh food to deteriorate from grade #5 (perfect) to grade #4 (good). Thus, from a comparison of the curves 101 and 102 in Fig. 14, it will be observed that the extension of the time interval mentioned in the satisfactory storage of lettuce was from 9.5 to 16.1 days, or 69%. From a comparison of the curves 111 and 112 in Fig. 15, it will be observed that the extension of the time interval mentioned in the satisfactory storage of celery was from 6.5 to 9.5 days, or 46%. From a comparison of the curves 121 and 122 in Fig. 16, it will be observed that the extension of the time interval mentioned in the satisfactory storage of asparagus was from 11.8 to 16.1 days, or 37%. From a comparison of the curves 131 and 132 in Fig. 17, it will be observed that the extension of the time interval mentioned in the satisfactory storage of strawberries was from 5.2 to 7.8 days, or 50%. From a comparison of the curves 141 and 142 in Fig. 18, it will be observed that the extension of the time interval mentioned in the satisfactory storage of tomatoes was from 11.0 to 17.0 days, or 55%.

The important portions of the complete data are recapitulated in the table below:

Table

| Food item | Grade transition | Standard pans, storage—days | Gamma pans, storage—days | Improvement | |
|---|---|---|---|---|---|
| | | | | Days | Percent |
| Lettuce | 5 to 4 | 9.5 | 16.1 | 6.6 | 69 |
| | 5 to 3.5 | 15.2 | 25.1 | 9.9 | 65 |
| | 5 to 3 | 21.9 | 34.0 | 12.1 | 55 |
| Celery | 5 to 4 | 6.5 | 9.5 | 3.0 | 46 |
| | 5 to 3.5 | 10.3 | 15.0 | 4.7 | 46 |
| | 5 to 3 | 14.8 | 20.7 | 5.9 | 40 |
| Asparagus | 5 to 4 | 11.8 | 16.1 | 4.3 | 37 |
| | 5 to 3.5 | 16.2 | 20.3 | 4.1 | 25 |
| | 5 to 3 | 20.1 | 24.1 | 4.0 | 20 |
| Strawberries | 5 to 4 | 5.2 | 7.8 | 2.6 | 50 |
| | 5 to 3.5 | 7.4 | 10.9 | 3.5 | 47 |
| | 5 to 3 | 9.8 | 13.9 | 4.1 | 42 |
| Tomatoes | 5 to 4 | 11.0 | 17.0 | 6.0 | 55 |
| | 5 to 3.5 | 15.7 | 21.7 | 6.0 | 38 |
| | 5 to 3 | 21.0 | 26.1 | 5.1 | 24 |

In view of the foregoing, it is apparent that the present method of and apparatus for preserving fresh foods of the class mentioned materially extends the safe storage time between grade #5 and grade #4 that is of fundamental importance to the housewife in the preservation of such foods in her household refrigerator.

In other substantially identical fresh food preservation tests involving modified gamma receptacles, it was established that the utilization of dosage rates in the receptacles substantially below the band of the foregoing test were ineffective materially to increase the satisfactory storage time intervals of the fresh foods mentioned beyond those obtained in the standard storage receptacles; and likewise, in still other substantially identical fresh food preservation tests involving other modified gamma receptacles, it was established that the utilization of dosage rates in the receptacles substantially above the band of the foregoing test were ineffective materially to increase the satisfactory storage time intervals of the fresh foods mentioned beyond those obtained in the gamma storage receptacles involved in the foregoing test. In other words, in the extension of the safe storage time intervals of such fresh foods in the receptacle, it is really not worthwhile to increase the dosage rates therein beyond the band extending from about 10 milliroentgens per hour to about 20 milliroentgens per hour as the general principle of diminishing returns has definitely set-in at the upper limit of this band, and the incorporation of a larger amount of activity in the receptacle is objectionable because of the problem concerning health hazards.

Actually, the incorporation of the specific activity (about 0.5 microcurie per square inch) in the intermediate coat 31c2 of the coating 31c carried by the interior surface of the wall 31a of the receptacle 31 is in no way within itself a health hazard, since the maximum prescribed level of $Co^{60}$ contained within the human body is 1 microcurie. Hence, a person would need to ingest really a great mass of flaked enamel from the interior coating 31c of the receptacle 31 in order to fix all of the $Co^{60}$ contained in two square inches of the intermediate coat 31c2 before exceeding the MPL (maximum permissible level) for $Co^{60}$; whereby such person would unquestionably reach the MLD (minimum lethal dose) for ground glass long before he reached the MPL for $Co^{60}$.

Moreover, the gamma ray dosage rates established within the receptacle 31 are incapable of inducing any detectible radioactivity in the stored food, in the containers holding the food, etc. Specifically in repeated tests, no radioactivity whatever was detected resulting from effects produced by the gamma rays within the receptacle 31.

While the construction of the receptacle 31 has been disclosed involving the interior coating 31c, including the three coats 31c1, 31c2 and 31c3, it will be understood that this arrangement is merely illustrative of the invention and is by no means critical, as it is apparent that in the interior coating 31c the ground coat 31c1 may be eliminated, if desired. Moreover, the interior coating 31c may comprise only a single coat or layer having the radioactive material directly incorporated therein, etc. Furthermore, the exterior coating 31b may be of the same construction as the interior coating 31c, since it is apparent the intervening metal wall 31a would comprise only a moderate absorption layer with respect thereto, as far as the resulting dosage rate in the receptacle 31 is concerned. In fact, considerable simplification in manufacture may be achieved by constructing both of the coatings 31b and 31c in an identical manner, as such arrangement would readily lend itself to automatic operations in producing the coatings, rendering feasible conventional enamel dipping steps.

While the incorporation of the radioactive gamma emitting materials $Zn^{65}$ and $Co^{60}$ into the coatings has been disclosed in detail, it will be understood that the utilization of these relatively expensive materials is in no way critical, and that the cheaper nuclear fission products may be substituted therefor. It will be recalled that the nuclear fission of $U^{235}$, $U^{233}$, $Pu^{239}$, etc. is productive of a great variety of products, the great majority of which are radioactive and subject to successive transformations involving many gamma emissions. These fission products are produced in relatively large quantities in nuclear reactors of the moderator type; and unquestionably ultimately the U.S. Atomic Energy Commission will release these products for use by manufacturers under supervised and controlled conditions and for proper and non-hazardous incorporation into articles of commerce. Specific disclosure of certain data in hand clearly indicating the feasibility of the utilization of the products mentioned in the present construction is deliberately withheld because of classification restrictions, but to those persons entitled to practice the present invention in this particular, this data is either known or may be acquired through the U.S. Atomic Energy Commission.

In view of the foregoing, it is apparent that there is no health hazard whatever involved in the utilization of the receptacle 31 in the storage space 22 of the refrigerator cabinet 20, whereas the extension of the safe storage time interval of fresh foods of the class including vegetables, fruits and berries, is substantially extended by the practice of the present method and the utilization of the present apparatus. It is further apparent that the method and the apparatus are generally applicable to a wide variety of refrigerating apparatus, including not only household refrigerators, but also food storage lockers or chests, as well as industrial cold storage equipment.

While there has been described what is at present considered to be the preferred embodiment of the invention, it will be understood that various modifications may be

What is claimed is:

1. The method of preserving a fresh food selected from the class consisting of vegetables, fruits and berries, comprising storing the fresh food within a receptacle arranged within the refrigerated storage compartment of a household refrigerator, and simultaneously subjecting the stored fresh food to irradiation with highly diffused gamma rays emitted from a well distributed and highly dispersed source carried by the interior walls of the receptacle, wherein the dosage rates throughout the interior of the receptacle fall within a band extending from about 10 milliroentgens per hour to about 20 milliroentgens per hour.

2. In a household refrigerator for preserving fresh foods selected from the class including vegetables, fruits, berries, etc., and including structure defining a storage compartment, and means for refrigerating said storage compartment; the combination comprising a receptacle arranged in said storage compartment and provided with wall structure defining a storage space adapted to receive the fresh food to be preserved, and a source of highly diffused gamma rays carried by said wall structure, said source being well distributed and highly dispersed so that the dosage rates throughout said storage space fall within a band disposed entirely below 100 milliroentgens per hour.

3. The household refrigerator combination set forth in claim 2, wherein the band extends from about 10 milliroentgens per hour to about 20 milliroentgens per hour.

4. The household refrigerator combination set forth in claim 2, wherein said source is in the form of a layer carried by the surface of said wall structure and incorporating radioactive material that is thoroughly distributed and highly dispersed therein, said layer having an area that is at least equal to a major fraction of the total area of the interior surface of said wall structure.

5. The household refrigerator combination set forth in claim 4, wherein said radioactive material comprises $Zn^{65}$.

6. The household refrigerator combination set forth in claim 4, wherein said radioactive material comprises $Co^{60}$.

7. The household refrigerator combination set forth in claim 4, wherein said radioactive material comprises nuclear fission products.

8. A receptacle adapted to be received in the refrigerated compartment of a household refrigerator and comprising wall structure defining a storage space adapted to receive fresh food to be preserved, and a source of highly diffused gamma rays carried by said wall structure, said source being well distributed and highly dispersed so that the dosage rates throughout said storage space fall within a band disposed entirely below 100 milliroentgens per hour.

9. A receptacle adapted to be received in the refrigerated compartment of a household refrigerator and comprising wall structure defining a storage space adapted to receive fresh food to be preserved, and a coating carried on the surface of said wall structure and having radioactive material incorporated therein that is characterized by the emission of gamma rays, said radioactive material being thoroughly distributed and highly dispersed in said coating so that the gamma rays permeating said storage space are highly diffused and so that the dosage rates throughout said storage space fall within a band disposed entirely below 100 milliroentgens per hour.

10. A receptacle adapted to be received in the refrigerated compartment of a household refrigerator and comprising metal walls defining a storage space, and a coating carried by and intimately bonded to the interior surfaces of said walls and having radioactive material incorporated therein that is characterized by the emission of gamma rays, said radioactive material being thoroughly distributed and highly dispersed in said coating so that the gamma rays permeating said storage space are highly diffused and so that the dosage rates throughout said storage space fall within a band disposed entirely below 100 milliroentgens per hour.

11. A receptacle adapted to be received in the refrigerated compartment of a household refrigerator and comprising metal walls defining a storage space, and a coating carried by and intimately bonded to the interior surfaces of said walls and having radioactive material incorporated therein that is characterized by the emission of gamma rays, said radioactive material being thoroughly distributed and highly dispersed in said coating so that the specific activity of said coating is both substantially uniform and somewhat below 1 microcurie per square inch of surface thereof.

12. A receptacle adapted to be received in the refrigerated compartment of a household refrigerator and comprising metal walls defining a storage space, and a porcelain enamel coating carried by and intimately bonded to the interior surfaces of said walls and having radioactive material incorporated therein that is characterized by the emission of gamma rays, said radioactive material being thoroughly distributed and highly dispersed in said coating so that the specific activity of said coating is both substantially uniform and somewhat below 1 microcurie per square inch of surface thereof.

13. A receptacle adapted to be received in the refrigerated compartment of a household refrigerator and comprising metal walls defining a storage space, and a fused porcelain enamel coating carried by the interior surfaces of said walls, said coating being of composite structure and including a ground coat or zone directly fused and bonded to the interior surfaces of said walls and an intermediate coat or zone directly fused and bonded to said ground coat and a finish coat or zone directly fused and bonded to said intermediate coat, wherein said intermediate coat has radioactive material incorporated therein that is characterized by the emission of gamma rays, said radioactive material being thoroughly distributed and highly dispersed in said intermediate coat so that the specific activity of said coating is both substantially uniform and somewhat below 1 microcurie per square inch of surface thereof.

14. The receptacle set forth in claim 9, wherein said radioactive material comprises $Zn^{65}$.

15. The receptacle set forth in claim 9, wherein said radioactive material comprises $Co^{60}$.

16. The receptacle set forth in claim 9, wherein said radioactive material comprises nuclear fission products.

17. In a method of preserving fresh food selected from the class consisting of vegetables, fruits and berries, the steps of storing such fresh food in a confined space, refrigerating said space to maintain the temperature thereof substantially below room temperature, circulating air through said space, and continuously permeating said space with gamma rays from a highly diffused source and maintaining the dosage rates throughout the space within a band disposed entirely below 100 milliroentgens per hour.

18. The method set forth in claim 17, wherein the width of the band is not substantially greater than 10 milliroentgens per hour.

19. The method set forth in claim 17, wherein the band extends from about 10 milliroentgens per hour to about 20 milliroentgens per hour.

20. The method set forth in claim 17, wherein the gamma rays permeating the space are emitted from a well distributed and highly dispersed source having an area commensurate with a major fraction of the boundary area of the space.

21. The method set forth in claim 17, wherein the gamma rays permeating the space have an energy somewhat in excess of one MEV.

22. The method set forth in claim 17, wherein the gamma rays are characteristic of the disintegration of $Zn^{65}$.

23. The method set forth in claim 17, wherein the gamma rays are characteristic of the disintegration of $Co^{60}$.

24. The method set forth in claim 17, wherein the gamma rays are characteristic of emissions from nuclear fission products.

25. In a method of increasing the storage life of fresh foods in the class consisting of vegetables, fruits and berries before deterioration thereof from a high grade to the next lower grade in a quality grading scale, the steps of storing such fresh food within a confined space, refrigerating the space to maintain the temperature thereof in the approximate range of 35° F. to 50° F., changing the air within said space by circulation therethrough, substantially surrounding said space with a highly diffused source of gamma radiation to continuously permeate the space therewith, and maintaining the dosage rates of gamma radiation throughout the space within a band not substantially greater than 10 milliroentgens per hour.

26. In combination with a refrigerated storage compartment, a receptacle having surrounding walls defining a substantially enclosed space therewithin, means comprising flow passages defined by said surrounding walls for permitting the continuous ingress and egress of air through said space, and a highly diffused source of gamma radiation carried by a major area of said walls to substantially surround the space with such source, said source being characterized by continuously permeating said space with gamma rays providing a dosage rate coming within a band not substantially greater than 10 milliroentgens per hour, whereby fresh foods taken from the class of vegetables, fruits and berries and stored within said space have a substantially increased storage life before deterioration thereof from a higher grade to the next lower grade in a quality grading scale.

References Cited in the file of this patent

UNITED STATES PATENTS

| | | |
|---|---|---|
| 1,275,417 | Gillet | Aug. 13, 1918 |
| 1,364,950 | O'Hara | Jan. 11, 1921 |
| 1,911,913 | Mayor | May 30, 1933 |
| 2,096,746 | James | Oct. 26, 1937 |
| 2,378,328 | Robinson | June 12, 1945 |
| 2,479,882 | Wallhausen et al. | Aug. 23, 1949 |
| 2,525,035 | Joris | Oct. 10, 1950 |

OTHER REFERENCES

Food Science Abstracts, March 1954, pages 121 to 125.

Applied Microbiology, November 1954, pages 330 to 332.